April 16, 1963   D. REYNOLDS   3,085,496
SINGLE CUP FRESH COFFEE BREWER
Filed July 17, 1959   5 Sheets-Sheet 3
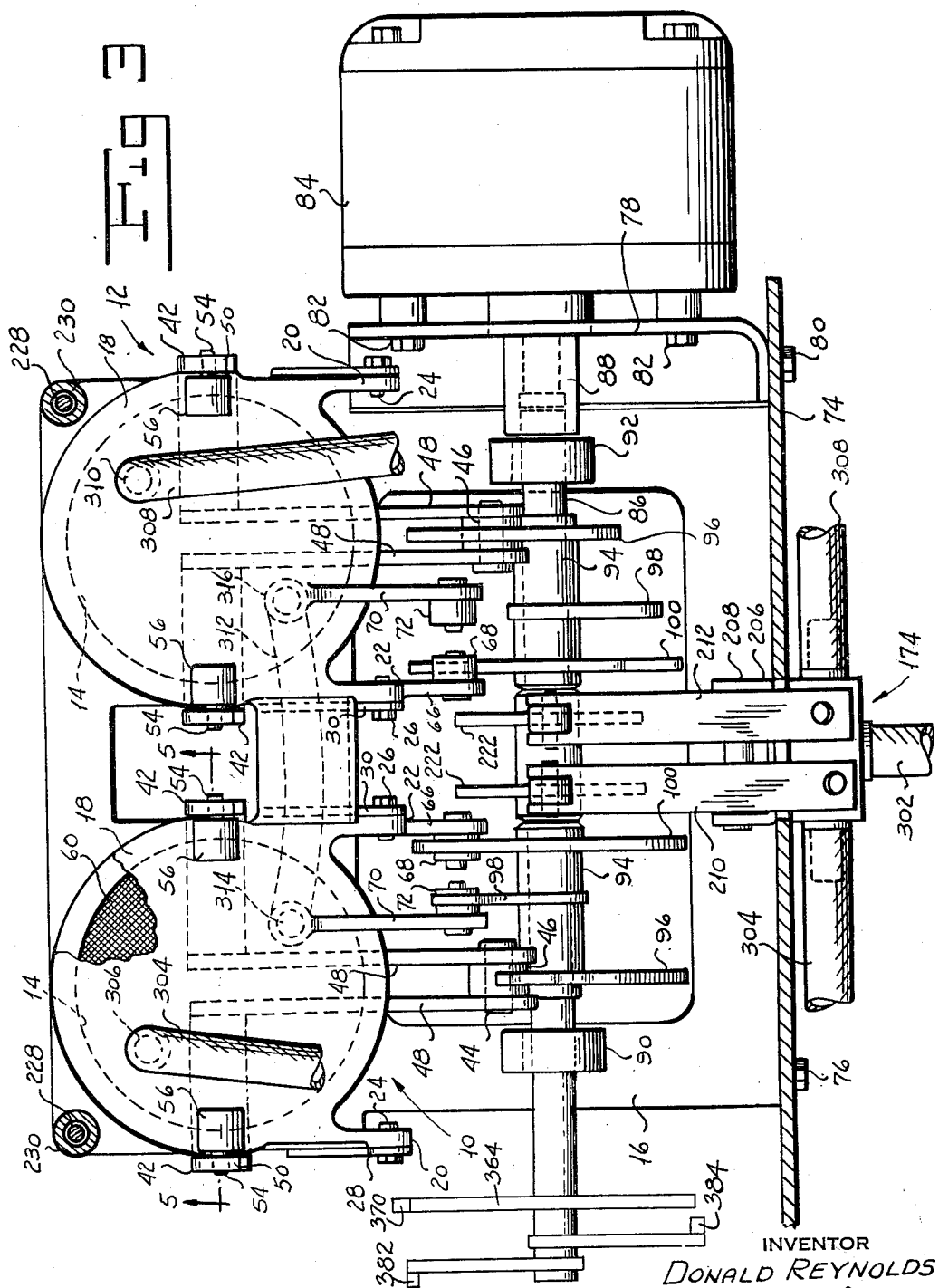
INVENTOR
DONALD REYNOLDS
BY Henry L. Shenier
ATTORNEY April 16, 1963  D. REYNOLDS  3,085,496
SINGLE CUP FRESH COFFEE BREWER
Filed July 17, 1959  5 Sheets-Sheet 4

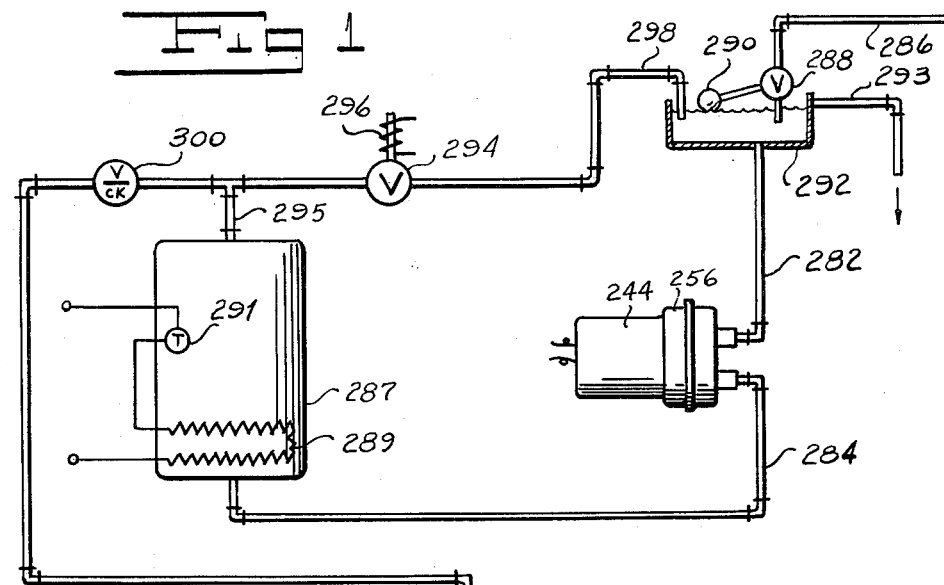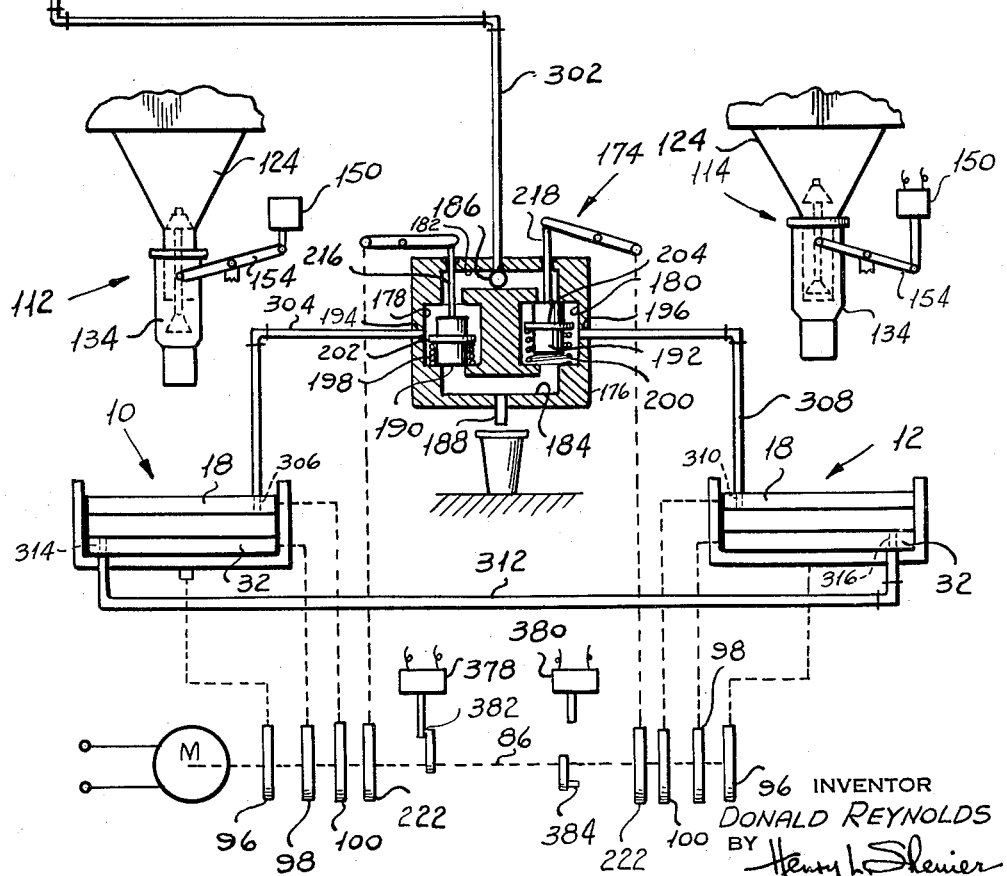

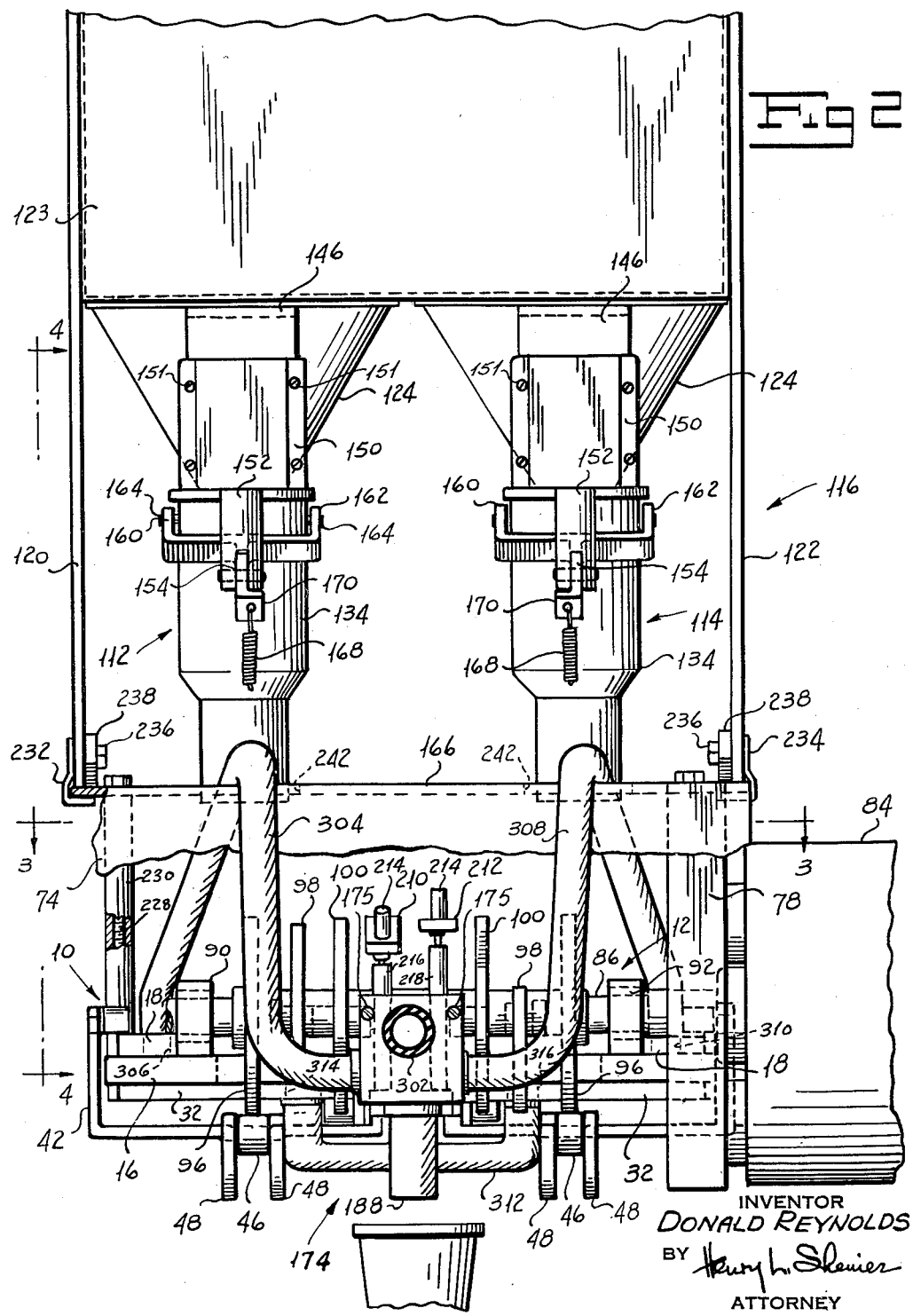

Fig 4

INVENTOR
DONALD REYNOLDS
BY Henry L. Shenier
ATTORNEY

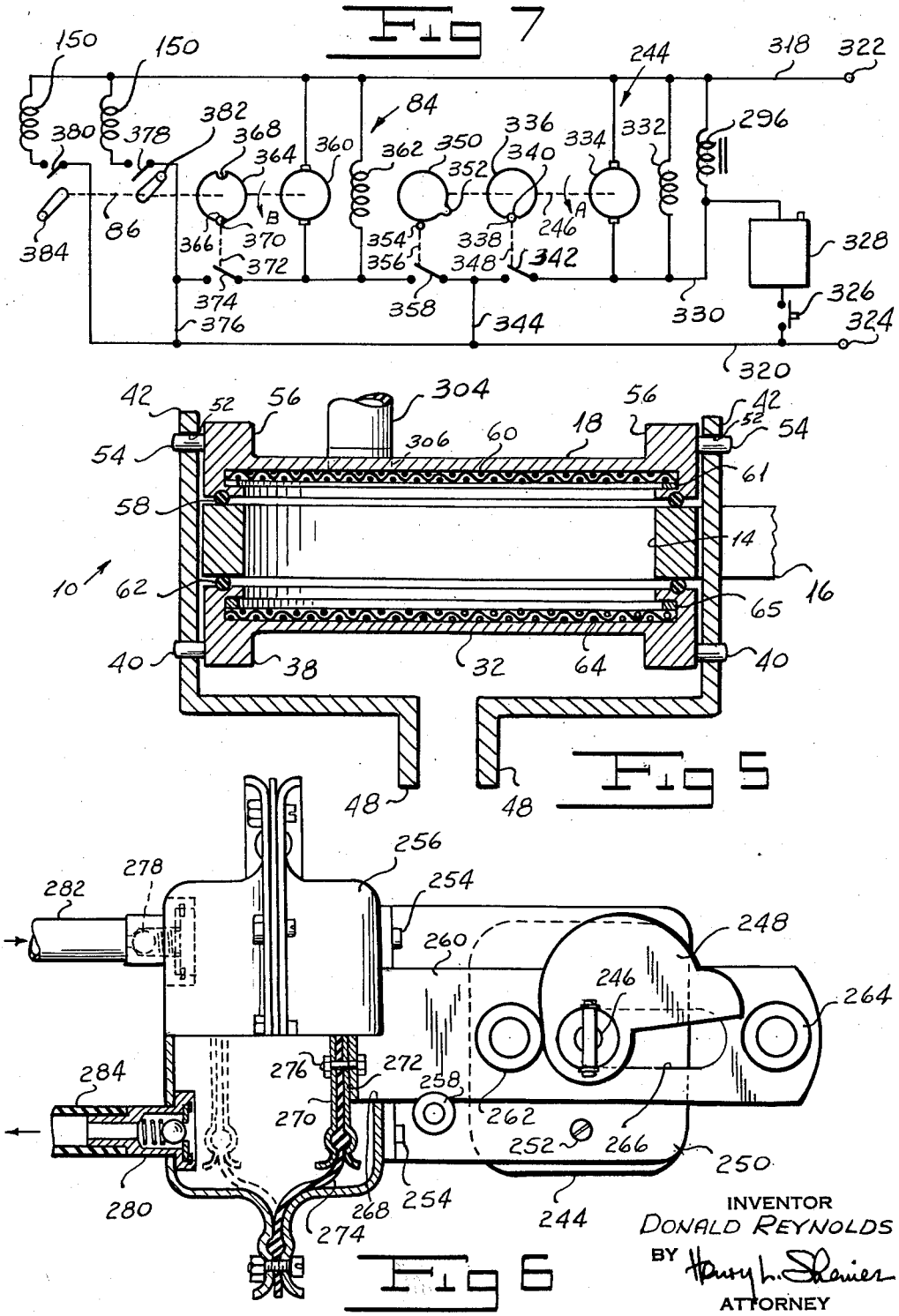

United States Patent Office 3,085,496
Patented Apr. 16, 1963

3,085,496
SINGLE CUP FRESH COFFEE BREWER
Donald Reynolds, Wilmette, Ill., assignor to Rowe Manufacturing Co., Inc., Whippany, N.J., a corporation of New York
Filed July 17, 1959, Ser. No. 827,870
9 Claims. (Cl. 99—289)

My invention relates to a single cup fresh coffee brewer and more particularly to an improved coffee merchandising machine which overcomes the disadvantages of coffee merchandising machines of the prior art.

In the prior art coffee dispensing machines are known in which a measured quantity of powdered coffee is mixed with hot water to produce the cup of coffee being dispensed. These machines have not proved satisfactory. Powdered coffee deteriorates rapidly in storage as it loses the aromatic oils which give the coffee its distinctive flavor. Thus the coffee produced by a coffee dispensing machine which uses powdered coffee is not as flavorful as is desired. Coupled with this fact is the clear preference of discriminating coffee drinkers for brewed ground coffee over powdered coffee.

Attempts have been made in the prior art to provide coffee merchandising machines which dispense coffee brewed from ground coffee. It normally takes approximately three minutes to brew a satisfactory cup of coffee from ground coffee. This is an excessively long period of time for the operation of a merchandising machine to dispense a cup of coffee. One suggestion which has been advanced in the prior art for avoiding this problem is to brew from ten to fifteen cups of coffee in a batch and to dispense this batch a cup at a time from a reservoir. When the level of the brewed coffee in the reservoir drops to a predetermined level, a fresh batch of coffee is brewed. Since a merchandising machine normally is not in continuous use, the brewed batch of coffee must be stored for a period of time. During this time the brewed coffee quickly loses its flavor. If the machine is to dispense a satisfactory cup of coffee a predetermined time after a batch has been brewed, the remainder of the coffee in the old batch must be dumped and a fresh batch must be brewed and poured into the reservoir. This procedure involves considerable waste and a resultant loss to the operator of the machine. For this reason batch brewing coffee dispensing machines have not provided a practicable solution to the problem of dispensing fresh brewed coffee.

Another suggestion which has been advanced in the prior art for providing a solution to this problem of brewing and dispensing a fresh cup of coffee on each operation of a merchandising machine is the use of a relatively finely ground coffee. In such a system a large charge of coffee must be used on each operation of the machine to avoid the production of weak, watery coffee. In addition, not all the flavor is extracted from the ground coffee by this process. Owing to the fineness of the ground coffee in such a system, an unpleasant "mud" settles in the bottom of the cup of brewed coffee. To operate such a system economically an unsatisfactory compromise must be made between a lower limit of fineness of grind beyond which an excessive sediment forms in the cup of brewed coffee and an upper limit of coarseness of the grind beyond which insufficient flavor is extracted from the ground coffee.

Still another suggestion which has been advanced in the prior art is the provision of a brewer having a pair of rotatable brewing cups, the upper one of which contains fresh ground coffee and the lower one of which contains partially leached ground coffee. Upon operation of the machine hot water passes under the influence of gravity first through the fresh coffee and then through the partially leached coffee to the cup. When the flow of water stops the units revolve through a half revolution so that the cups change positions. In the course of this movement the cup which initially held the partially leached ground coffee is dumped and is filled with fresh coffee as it arrives at the upper position. This machine embodies a number of disadvantages. The hot water passing first through the fresh ground coffee permits the partially leached ground coffee to absorb some of the flavor which has been extracted from the fresh coffee. Owing to the fact that gravity feed of the water is employed, the time for delivery is relatively long. Since the machine employs the relatively fine "drip" grind, sediment forms in the cup of coffee dispensed. If a satisfactory cup of coffee is to be brewed by this machine, a relatively large amount of coffee must be used on each operation.

I have invented a single cup fresh coffee brewer which overcomes the disadvantages of brewers of the prior art pointed out hereinabove. My brewer has a very short brewing time with the result that its cycle of operation consumes a much smaller time than do the cycles of operation of machines of the prior art. My brewer is able to use ordinary percolator grind coffee. In my brewer substantially all of the flavor is extracted from the ground coffee with the result that there is no waste. My machine is self-cleaning so that it is always conditioned to make uncontaminated coffee. The brewing chambers of my machine are stationary with the resulting simplicity of the operating mechanism and the consequent reduction in cycle time.

One object of my invention is to provide a single cup fresh coffee brewer which overcomes the defects of coffee dispensing machines of the prior art.

A further object of my invention is to provide a single cup fresh coffee brewer having stationary brewing chambers.

A still further object of my invention is to provide a single cup fresh coffee brewer which is self-cleaning.

Still another object of my invention is to provide a single cup fresh coffee brewer which uses ordinary percolator ground coffee.

Other and further objects of my invention will appear from the following description.

In general my invention contemplates the provision of a single cup fresh coffee brewer including first and second brewing chambers which, prior to a dispensing operation, respectively contain a charge of damp partially leached ground coffee remaining from the preceding operation and a charge of fresh ground coffee. In response to operation of my machine, a charge of hot water is driven by a pump sequentially through the first chamber carrying the partially leached coffee, through the second chamber containing the fresh coffee and from the second chamber to the cup. Following the delivery of the coffee to the cup and while the water still flows, the bottom of the first chamber opens and the water flushes this chamber. After the flushing operation the bottom of the first chamber closes, its top opens, and a measured charge of fresh ground coffee is dumped into the first chamber. When the chamber is loaded, the top closes and the parts of the chamber are locked closed. On the next dispensing operation, I reverse the flow of hot water, sending the water sequentially through the second chamber, and through the first chamber and into the cup. During this succeeding operation the parts of the second chamber are actuated in the same manner as were the parts of the first chamber during the preceding operation.

In the accompanying drawings which form part of the instant specification and which are to be read in conjunction therewith and in which like reference numerals are used to indicate like parts in the various views:

FIGURE 1 is a schematic view showing the relative positions of the various parts of my single cup fresh coffee brewer.

FIGURE 2 is a front elevation of the brewing chambers and ground coffee dispensers of my single cup fresh coffee brewer.

FIGURE 3 is a sectional view of my single cup fresh coffee brewer taken along the line 3—3 of FIGURE 2 and drawn on an enlarged scale.

FIGURE 4 is a side elevation of the brewing chambers and ground coffee dispensers of my single cup fresh coffee brewer with parts broken away and other parts shown in section taken along the line 4—4 of FIGURE 2 and drawn on an enlarged scale.

FIGURE 5 is a sectional view of a brewing chamber of my single cup fresh coffee brewer taken along the line 5—5 of FIGURE 3 and drawn on an enlarged scale.

FIGURE 6 is a side elevation with parts broken away and with other parts shown in section of the pump of my single cup fresh coffee brewer.

FIGURE 7 is a schematic view of one form of electrical circuit which may be employed to control my single cup fresh coffee brewer.

Referring now more particularly to FIGURES 1 to 5 of the drawings, my brewer includes respective brewing chambers indicated generally by the respective reference characters 10 and 12. Referring now to FIGURE 3, a pair of spaced openings 14 in a horizontal plate 16 form the central portions of the chambers 10 and 12. I provide each of the chambers 10 and 12 with a cover 18 having ears 20 and 22 by means of which the cover is pivotally supported on pins 24 and 26 carried by supports 28 and 30 formed on the plate 16. Each chamber 10 and 12 includes a bottom 32 formed with ears 34 by means of which the bottom is pivotally supported on pins 36 carried by the supports 28 and 30.

Referring now to FIGURES 4 and 5, I form the bottoms 32 of the chambers 10 and 12 with spaced bosses 38 which carry pins 40 for pivotally supporting a pair of locking yoke arms 42. I employ any suitable means such as a pin 44 carrying a cam follower 46 for connecting the portions 48 of the arms 42 to cause the arms 42 to move as a unit. I provide the end of each arm 42 with a hook 50 having a cam surface 52 adapted to engage a pin 54 carried by a boss 56 formed on the top 18 of the chamber. From the structure just described it can be seen that as arms 42 rotate in a clockwise direction, as viewed in FIGURE 4, the cam surfaces 52 engage pins 54 to draw both the top 18 and the bottom 32 of the brewing chamber against the plate 16 to close the chamber.

Referring now to FIGURE 5, I provide the top 18 of each chamber with a sealing ring 58 retained in the periphery of the top by any suitable means known to the art such, for example, as by adhesive. Top 18 also carries a screen 60 retained in the top by means of a snap ring 61 or the like. I provide each of the bottoms 32 with a sealing ring 62 adhered or otherwise secured to the bottom and with a fine mesh screen 64 retained in the bottom by means of a snap ring 65 or the like. When the arms 42 are actuated in the manner described hereinabove, rings 58 and 62 engage the plate 16 to seal the chamber.

I form or otherwise provide the bottom 32 of each chamber with an arm 66 carrying a cam follower roller 68. An arm 70 formed or otherwise secured to the top 18 rotatably supports a cam follower roller 72.

A front plate 74 secured to the plate 16 by any suitable means such as by screws 76 carries a motor support bracket 78 by means of screws 80. Bolts 82 secure a motor 84 to the bracket 78. When energized in a manner to be described hereinafter, motor 84 drives a shaft 86 through a suitable flexible coupling 88. Respective bearings 90 and 92 rotatably support the shaft 86 on plate 16. A hub 94 carried by the shaft 86 for rotation therewith carries a locking yoke operating cam 96, a top operating cam 98, and a bottom operating cam 100. I provide a hub 94 and a set of cams 96, 98, and 100 for each of the chambers 10 and 12. In the normal position of my brewer before a dispensing operation is initiated, cams 96, 98, and 100 are in the position shown in FIGURE 4. In this position follower 46 is in engagement with the outer peripheral surface 102 of cam 96. This surface 102 urges the locking yoke arms 42 to their extreme positions in the clockwise direction of movement as viewed in FIGURE 4 to lock the top 18 and the bottom 32 of the brewing chamber in their closed positions. At the same time the top follower 72 is out of engagement with cam 98 and the bottom follower 68 is inactive owing to the action of the locking cam 96 on follower 46. That is, since the brewer is in its locked condition the engagement of cam 100 with follower 68 produces no movement of the bottom 32.

In the course of a dispensing operation to be described hereinafter, shaft 86 makes a half revolution in a counter-clockwise direction, as viewed in FIGURE 4. From the position of the parts shown in FIGURE 4, the top and bottom operating cams associated with the chamber 10 are active during this half revolution, while the top and bottom operating cams of the chamber 12 are inactive owing to the fact that the locking cam 96 of the chamber 12 keeps the parts of the chamber 12 locked during this half revolution. That is, since the top 18 and the bottom 32 are locked in their closed positions the engagement of the top cam 98 and the bottom cam 100 with the followers would produce no result. As the shaft 86 begins to turn, follower 46 leaves the surface 102 and is free to fall into the cam recess 104. While the follower 46 in this position of the parts is free to fall into the recess 104, it will not fall into the recess until the bottom 32 is permitted to drop. This action unlocks the chamber 10. Upon further revolution of shaft 86 follower 68 is permitted to move into the recess 106 in cam 100 and the bottom carrying the yoke arms 42 falls away from the plate 16 to the broken line position shown in FIGURE 4. Upon further rotation of shaft 86 a surface 108 of cam 98 engages the follower 72 to pivot arm 70 in a clockwise direction, as viewed in FIGURE 4, to move the top to the broken line position. As the shaft continues to rotate, the trailing edge 110 of cam recess 106 engages follower 68 to close the bottom 32. Shortly after this occurs, cam 98 leaves follower 72 and the top 18 closes. As shaft 86 completes half a revolution, surface 102 of cam 96 again actuates follower 46 to lock the top and bottom of the chamber 10. As will be described more fully hereinafter, in the course of the next dispensing operation, the top and bottom cams associated with chamber 10 are inactive.

Referring more particularly to FIGURES 2 and 4, my brewer includes respective coffee dispensing devices, indicated generally by the reference characters 112 and 114, each of which is adapted to dispense a measured amount of coffee. A generally U-shaped frame, indicated generally by the reference character 116, has a back 118 and sides 120 and 122. The frame 116 supports a bin 123 carrying a supply of ground coffee. Bin 123 leads into respective hoppers 124, one of which is associated with each of the devices 112 and 114. I form each of the hoppers with a cylindrical outlet 126 through which ground coffee is adapted to pass to the brewing chamber 10 or 12 with which the hopper is associated. A spring 128 extending between an annular flange 130 formed on outlet 126 and a retaining flange 132 formed at the top of a dispensing sleeve 134 normally urges the sleeve to the full line position shown in FIGURE 4. I secure a valve head 136 to the sleeve 134 for movement therewith by any suitable means such as by rivets 138 or the like passing through tabs 140 provided on the valve head 136. Under the action of spring 128, head 136 normally seats against the lip of the outlet 126 to prevent the passage of coffee from the hopper 124 to the chamber with which it is associated. A rod 142 secures a check valve head 144 in spaced relationship to the head 136. The length of rod 142 is such that head 144 normally permits the passage of ground coffee from the hopper 124 into the outlet 126. When the sleeve is actuated in a manner to be described to move against the action of spring 128, head 144 is adapted to seat in the bottom of the hopper 124 to prevent the passage of ground coffee into the outlet 126.

A bracket 146, secured to the bin 122 by means of rivets 148 or the like, carries a solenoid winding 150 by means of screws 151 or the like. Solenoid 150, when energized, moves its armature 152 to actuate a lever 154 connected to the armature 152 by a pin 156. I pivotally mount the arm 154 on bracket 146 by means of a pin 158. I form one end of the lever 154 with yoke arms 160 and 162, the ends of which are secured to the sleeve 134 by any convenient means such as by pins 164.

I form the front plate 74 as integral member with a horizontal plate 166 extending rearwardly from the top of plate 74, as viewed in FIGURE 4. A spring 168 extending between an offset lug 170 formed on the end of lever 154 and a pin 172 on the plate 166 normally urges the lever 154 to rotate in a counterclockwise direction, as viewed in FIGURE 4, to assist spring 128 in resetting the solenoid armature 152 after its actuation. It is to be understood that I provide a lever 154 and its associated mechanism for the dispensing device 114 as well as for the dispensing device 112.

Referring now to FIGURES 1 to 4, I secure a three-way valve assembly, indicated generally by the reference character 174, to the plate 74 by any suitable means such, for example, as by bolts 175. Referring again to FIGURE 1, assembly 174 includes a body 176 divided into a pair of chambers 178 and 180. A passage 182 connects the upper ends of chambers 178 and 180 while a passage 184 connects the lower ends of the chambers. I provide the body 176 with an inlet passage 186 leading into the passage 182 and with an outlet opening 188 leading out of the passage 184. Respective plungers 190 and 192 disposed in chambers 178 and 180 are adapted to be moved between upper positions at which they close the upper ends of their respective chambers and lower positions at which they close the lower ends of their respective chambers. I provide the body 176 with respective openings 194 and 196 leading directly into the chambers 178 and 180 through the side walls thereof. Respective springs 198 and 200 extend between annular bosses 202 and 204 and the bases of chambers 178 and 180 normally to urge the pistons 190 and 192 to their up limit positions at which they close the tops of their associated chambers.

Referring now to FIGURE 4, a bracket 206 carried by the plate 74 supports a shaft 208 which forms a pivot for respective levers 210 and 212. Each lever 210 and 212 carries at one of its ends a pin 214 adapted to actuate one of the respective rods 216 and 218 of the pistons 190 and 192. The other end of each lever 210 and 212 carries a respective follower 220 adapted to be actuated by a cam 222 carried by shaft 86 for rotation therewith. Each cam 222 has a high surface 224 and a low surface 226. With the follower 220 of a lever 210 or 212 in engagement with surface 224, the lever actuates its associated plunger against the action of the corresponding spring 198 or 200 to close the bottom of the chamber. When in engagement with the low surface 226 of its cam, the follower 220 permits the spring 198 or 200 to move its piston 190 or 192 to a position at which it closes the top of chamber 178 or 180. I mount the cams 222 or shaft 86 for rotation therewith at positions at which they are displaced by 180°. In this manner pistons 190 and 192 are actuated so that when one piston closes the bottom of its associated chamber, the other piston closes the top of its chamber.

Referring now to FIGURE 2, a plurality of elongated screws 228 extending through spacers 230 secure the plate 166 to the plate 16. I secure respective guide tracks 232 and 234 along the lower edges of the sides 120 and 122 of the frame 116 by any suitable means such as by welding or the like. Screws 236 or the like pivotally support respective latches 238 on the inner surface of the sides 120 and 122. To assemble the brewing chambers and their control mechanism on the frame 166, I slide the edges of the plate 166 outboard of the spacers 230 along the tracks 232 and 234. With the assembly in position latches 238 drop under the influence of gravity into respective recesses 240 formed in the edges of the plate 166. In this manner the brewing chamber and its control assembly are removably supported on the frame 116. I provide the plate 166 with openings 242 through which the lower ends of sleeves 134 extend.

Referring now to FIGURE 6, my brewer includes a pump motor 244 adapted to be energized to drive shaft 246 carrying a cam 248 for rotation therewith. I mount the motor 244 on a bracket 250 supported on the machine frame by means of bolts 252. I employ any suitable means such as bolts 254 for mounting a pump housing 256 on the bracket 250. A guide roller 258 carried by the bracket 250 supports a slider 260 having respective spaced cam followers 262 and 264 adjacent the ends of a slot 266 through which shaft 246 extends. When motor 244 is energized to drive shaft 246, cam 248 actuates followers 262 and 264 to reciprocate the slide 260. Slide 260 extends through an opening 268 in housing 256. A pair of plates 270 and 272 disposed on opposite sides of a flexible diaphragm 274 clamped between the sides of housing 256 are secured to the slider 260 for movement therewith by means of bolts 276. Respective check valves 278 and 280 connect respective lengths 282 and 284 of flexible hose to the interior of housing 256 on one side of the diaphragm 274. Valve 278 permits flow of fluid into housing 256 and prevents flow of fluid out of the housing. Valve 280 prevents flow of fluid into the housing but permits flow of fluid out of the housing. From the structure just described it will be seen that when slide 260 moves to the right, as viewed in FIGURE 6, under the action of cam 248 a charge of water is drawn into the housing from tube 282 through valve 278. When the slide 260 moves to the left, a measured charge of water is expelled under positive pressure from the housing 256 through valve 280 into pipe or tube 284.

Referring again to FIGURE 1, a pipe 286 connected to a suitable source (not shown) of water supplies water to a valve 288 actuated by a float 290 to supply water to a reservoir 292 only so long as the level of water is below a predetermined level. If desired, the reservoir 292 may be provided with an overflow pipe 293. I connect the tube or pipe 282 to reservoir 292. I connect the tube 284 to a hot water tank 287 provided with a heating element such, for example, as a resistor 289, the temperature of which is controlled by a thermostatic switch 291. I connect the outlet of tank 287 to a pipe 295. A vent valve 294 adapted to be closed in response to the energization of a solenoid winding 296 normally connects outlet pipe 295 to a pipe 298 extending below the surface of the water in reservoir 292. A check valve 300 connects the pipe 295 to a flexible tube 302 leading to the inlet port 186 of the valve assembly 174. As can be seen by reference to FIGURES 1 and 3, a length 304 of flexible tubing connects the port 194 to a port 306 formed in the top 18 of the chamber 10. A length of tubing 308 connects the port 196 to a port 310 in the top 18 of the chamber 12. A length 312 of tubing connects respective ports 314 and 316 in the bottoms 32 of the chambers to permit flow of water between the chambers.

Referring now to FIGURE 7, one form of electrical circuit which may be employed to control my brewer includes respective electrical conductors 318 and 320 connected to the respective terminals 322 and 324 of a suitable source of electrical energy. I connect a push button switch 326 in series with a suitable coin register 328 of any type known to the art between the conductor 320 and a conductor 330. I connect the winding 296, the field winding 332 of pump motor 244, and the armature 334 of motor 244 in parallel between conductor 330 and conductor 318. After a predetermined sum in coins has been deposited in the register 328 and upon the actuation of switch 326, winding 296 and motor 244 are momentarily energized. As the motor drives shaft 246, a follow through cam 336 carried by shaft 246 for rotation therewith drives its follower 338 out of the cam recess 340 to close a normally open switch 342 through a linkage 348. Upon closing, the switch 342 maintains the circuit of motor 244 and winding 296 through a conductor 344 leading to conductor 320. This circuit is maintained for one revolution of shaft 246 until follower 338 again drops into the recess 340.

Shaft 246 carries for rotation therewith a cam 350 provided with a radially extending projection 352 adapted to actuate a follower 354 to operate a linkage 356 to close a normally open switch 358. I connect one terminal of each of the armature 360 and field winding 362 of the chamber control motor 84 to conductor 318. I connect the switch 358 between the other terminals of windings 362 and armature 360 and the conductor 330. It will be seen that upon a predetermined rotation of shaft 246 in the direction of the arrow "A" in FIGURE 7 switch 358 closes to energize motor 384. A cam 364 carried by the shaft 86 for rotation therewith has respective substantially diametrically opposite recesses 366 and 368 adapted to receive a follower 370. As shaft 86 begins to turn, follower 370 is driven out of its recess to close a normally open switch 374 connected between the terminals of winding 362 and armature 360 to which switch 358 is connected and a conductor 376 leading to conductor 320. Switch 374 remains closed until shaft 86 completes a half revolution at which time follower 370 drops into the recess 366 or 368 opposite that recess in which it was originally disposed.

I connect the respective coffee dispensing device solenoid windings 150 in series with normally open switches 378 and 380 between conductor 318 and conductor 320. Respective pins 382 and 384 carried by diametrically oppositely extending arms on shaft 86 are adapted to actuate the respective switches 378 and 380. The pins 382 and 384 on shaft 86 which actuate switches 378 and 380 comprise a means for synchronizing the operation of the coffee dispensing devices 112 and 114 with the operation of the chambers 10 and 12.

The operation of my brewer is best understood by assuming that a dispensing operation has just been completed and that the parts of the mechanism are conditioned for the next operation. Let us assume that the chamber 10 contains a charge of partially leached ground coffee and that the chamber 12 contains a fresh charge of ground coffee. I have discovered that in order to brew a satisfactory cup of coffee the hot water from which the coffee is brewed should pass first through the partially leached grounds and then through the fresh ground coffee. With this operation the remaining flavor is extracted from the partially leached coffee before the water passes through the fresh coffee with the result that a full strength cup of coffee can be brewed in a relatively short time. In addition, this operation has the advantage that the partially leached ground coffee cannot absorb any of the flavor extracted from the fresh ground coffee as is possible when the hot water passes first through the fresh grind and then through the partially leached ground coffee remaining from the preceding operation. I accomplish this result by employing a charge of water under pressure further to reduce the brewing time.

In order to achieve the desirable operation outlined hereinabove, the arrangement of parts before a dispensing operation is initiated is such that the piston 190 is in its lowermost position at which it closes the bottom of chamber 178 and the piston 192 is in its uppermost position at which it closes the top of its chamber 180. When a sum in coins aggregating the purchase price of a cup of coffee is deposited in the register 328 and upon actuation of button 326, winding 296 and motor 244 are energized. Energization of winding 296 closes the valve 294 which normally permits the escape of vapor from the hot water tank 286. When the shaft 246 begins to rotate, cam 336 drives follower 338 out of the recess 340 to close switch 342. This action maintains the circuit of motor 244 for a single revolution. As the motor shaft 246 moves through a revolution, it reciprocates slider 260 to cause a charge of water to flow from the pump through the tank 286 through check valve 300 and through pipe 302 to the valve assembly 174. In the position of the parts of the valve assembly described hereinabove, the charge of water passes out through port 194, through pipe 304 and through the brewing chamber 10 to the pipe 312. From the pipe 312 the charge of water passes upwardly through the brewing chamber 12 containing the charge of fresh coffee and thence through port 196 and through channel 184 and outlet 188 to the cup.

After a predetermined rotation of shaft 246 in the direction of the arrow "A" in FIGURE 7 and while the water still flows, projection 352 actuates follower 354 to close switch 358 to energize motor 84. When this occurs, motor 84 drives its shaft 86 in the direction of the arrow "B" in FIGURE 7 which is a counterclockwise direction of rotation, as viewed in FIGURE 4. When shaft 86 begins to turn, cam 364 moves its follower 370 out of the recess 366 to ensure a half revolution of shaft 86. As the shaft 86 turns through this half revolution, the follower 46 associated with the chamber 10 first leaves the surface 102 of cam 96 with the result that this chamber, containing completely leached grounds, is unlocked. Upon further rotation of shaft 86 cam 100 permits the follower 68 associated with the chamber 10 to drop into the recess 106 to permit the bottom to open to the broken line position shown in FIGURE 4. It will be remembered that at this time the water still flows with the result that it flushes the completely leached grounds out of the chamber 10.

As the shaft 246 completes a revolution, follower 338 drops back into recess 340 and the water stops flowing. Upon further rotation of shaft 86 surface 110 of cam 100 engages follower 46 to close the bottom 32 of the chamber 10. After this occurs the surface 108 of cam 98 engages the follower 72 to move the top 18 of the chamber 10 to the broken line position shown in FIGURE 4. While the top is open, the pin 382 associated with the chamber 10 closes the normally open switch 378 to energize the solenoid 150 associated with chamber 10. Upon its energization the solenoid winding 150 draws its armature 152 into the winding to pivot lever 154 to the broken line position shown in FIGURE 4 to dump a measured amount of fresh ground coffee into the chamber 10. When cam 98 leaves follower 72, the top 18 closes. Following this action, cam 96 moves follower 46 to the surface 102 of the cam 96 to lock the top and bottom of the chamber 10 securely in position. It is to be noted that during this operation the cams 98 and 100 associated with the chamber 12 are inactive since the surface 102 of the cam 96 associated with the chamber 12 is in engagement with the follower 46 of the chamber 12 during this entire half revolution.

At any time after water stops flowing the follower 220 carried by arm 210 rides off the high surface 224 of its associated cam 222 and onto the lower suface 226 of the cam to permit the piston 190 to move to the upper position in chamber 178. Concomitantly with this action the follower 220 on the lever 212 moves from the low surface 226 of its cam 222 to the high surface 224 of the cam. As a result of this operation, the piston 192 is moved to the lower position within the chamber 180.

From the operation just described it will be seen that my brewer is set for the next dispensing operation with a charge of fresh ground coffee in the chamber 10 and with a charge of partially leached ground coffee in chamber 12. Moreover, the valve assembly 174 is set for the next operation to cause water to flow first through the chamber 12 carrying the partially leached coffee and then through the chamber 10 carrying the fresh coffee. The cams 96, 98, and 100 associated with the chamber 12 function during the course of the next dispensing operation while the top and bottom of the chamber 10 are not actuated during this operation.

It will be seen that I have accomplished the objects of my invention. I have provided a single cup fresh coffee brewer which rapidly and expeditiously brews a single cup of fresh coffee on each operation. My brewer has a much shorter cycle time than do brewers of the prior art. The arrangement of my brewer is such that I extract the full flavor from the ground coffee employed with the result that there is substantially no waste. The arrangement of my brewer is such that I may employ ordinary percolator grind coffee. My brewer automatically flushes a brewing chamber on each operation of the machine.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A single cup fresh coffee brewing machine including in combination a first chamber for holding a charge of partially leached coffee, a second chamber for holding a charge of fresh coffee, a brewed coffee discharge port, a source of hot water, means connecting the first and second chambers in series with said discharge port, means responsive to a first operation of said machine for passing water from said source under pressure sequentially through said first chamber and then through said second chamber to said discharge port, means for replacing the grounds in said first chamber with a charge of fresh coffee and means responsive to the succeeding operation of said machine for passing water from said source under pressure sequentially through said second chamber and through said first chamber to said discharge port.

2. A single cup fresh coffee brewing machine including in combination a first and a second brewing chamber, each of said brewing chambers comprising a body formed with an opening, a top, a bottom and means mounting said top and said bottom for movement from open positions to closed positions on said body, said top and said bottom being normally closed to close their associated chambers, said first chamber and said second chamber respectively being adapted to contain a charge of partially leached coffee and a charge of fresh coffee prior to an operation of said machine, a brewed coffee discharge port, a source of hot water, means responsive to the operation of said machine for passing water from said source sequentially through said first chamber and through said second chamber to said discharge port and means for opening said bottom while water flows to said first container to flush the grounds from said first container.

3. A single cup fresh coffee brewing machine including in combination a first and a second brewing chamber, each of said brewing chambers comprising a body formed with an opening, a top, a bottom and means mounting said top and said bottom for movement from open positions to closed positions on said body, said tops and bottoms being normally closed to close their associated chambers, said first chamber and said second chamber respectively being adapted to contain a charge of partially leached coffee and a charge of fresh coffee prior to an operation of said machine, a brewed coffee discharge port, a source of hot water, means connecting said chambers in series with said discharge port, means responsive to operation of the machine for passing a charge of water from said source sequentially through said first chamber and through said second chamber to said discharge port, means responsive to operation of the machine for opening the bottom of said first chamber during the flow of said charge of water, means for closing the bottom of said first chamber following the flow of said charge of water, means for opening the top of said first chamber following the flow of said charge of water, means for supplying a charge of fresh coffee to said first chamber and means for closing said first chamber top to prepare the machine for its next operation.

4. A single cup fresh coffee brewing machine including in combination a first and a second brewing chamber, each of said brewing chambers comprising a body formed with an opening, a top, a bottom and means mounting said top and said bottom for movement from open positions to seated positions on said body, said top and bottom being normally seated to close their associated chambers, said first chamber and said second chamber respectively being adapted to contain a charge of partially leached coffee and a charge of fresh coffee prior to an operation of said machine, a brewed coffee discharge port, a source of hot water, means connecting said chambers in series with said discharge port, means responsive to operation of the machine for passing a charge of water from said source sequentially through said first chamber and through said second chamber to said discharge port, means responsive to operation of the machine for opening the bottom of said first chamber during the flow of said charge of water, means for closing the bottom of said first chamber following the flow of said charge of water, means for opening the top of said first chamber following the flow of said charge of water, means for supplying a charge of fresh coffee to said first chamber, means for closing said first chamber top to prepare the machine for its next operation and means responsive to the next operation of said machine for passing a charge of water from said source sequentially through said second chamber and through said first chamber to said discharge port.

5. A single cup fresh coffee brewing machine including in combination first and second containers adapted respectively to hold a charge of partially leached coffee and a charge of fresh coffee, a source of hot water, means responsive to operation of said machine for passing water from said source sequentially through said first container and said second container, respective devices associated with said containers for depositing charges of fresh coffee in their associated containers and means for alternately operating said coffee dispensing devices on successive operations of said machine.

6. A single cup fresh coffee brewing machine including in combination a first container for holding a charge of partially leached coffee, a second container for holding a charge of fresh coffee, a first fresh ground coffee dispensing means associated with said first container, a second fresh ground coffee dispensing means associated with said second container, a brewed coffee discharge port, a source of hot water, means responsive to a first operation of said machine for passing water from said source sequentially through said first container and through said second container to said discharge port, means responsive to said first machine operation for flushing said first container and means responsive to said first machine operation for actuating said first fresh ground coffee dispensing means to deposit a fresh supply of ground coffee in said first container.

7. A single cup fresh coffee brewing machine including in combination a first container for holding a charge of partially leached coffee, a second container for holding a charge of fresh coffee, a first fresh ground coffee dispensing means associated with said first container, a second fresh ground coffee dispensing means associated with said second container, a brewed coffee discharge port, a source of hot water, means responsive to a first operation of said machine for passing water from said source sequentially through said first container and through said second container to said discharge port, means responsive to said first machine operation for flushing said first container, means responsive to said first machine operation for actuating said first fresh ground coffee dispensing means to deposit a fresh supply of ground coffee in said first container, means responsive to the succeeding operation of said machine for passing water from said source sequentially through said second container and through said first container to said discharge port, means responsive to said succeeding machine operation for flushing said second container and means responsive to said succeeding operation for actuating said second fresh ground coffee dispensing means.

8. A single cup fresh coffee brewing machine including in combination a stationary support, a first container for holding a charge of partially leached coffee, means mounting said first container in a fixed position on said support, a second container for holding a charge of fresh coffee, means mounting said second container in a fixed position on said support, a source of hot water, means responsive to the operation of said machine for alternately passing water from said source sequentially through said first container and through said second container and sequentially through said second container and through said first container on successive operations of said machine and means responsive to the operation of the machine for alternately replacing the grounds in said first container and the grounds in said second container with a charge of fresh coffee on successive operations of the machine.

9. A single cup fresh coffee brewing machine including in combination a first and a second brewing chamber, each of said brewing chambers comprising a body formed with an opening, a top, a bottom, and means mounting said top and bottom for movement from open positions to closed positions on said body, said tops and bottoms being normally closed to close their associated chambers, said first chamber and said second chamber respectively being adapted to contain a charge of partially leached coffee and a charge of fresh coffee prior to an operation of said machine, a brewed coffee discharge port, a source of hot water, means connecting said chambers in series with said discharge port, means including a first motor having a shaft and being responsive to operation of the machine for passing a charge of water from said source sequentially through said first container and through said second container to said discharge port, respective fresh ground coffee supply means adapted to be actuated to supply charges of fresh ground coffee to said chambers, and means including a second motor and means for energizing said second motor in response to a predetermined rotation of said first motor shaft for successively opening the bottom of said first chamber during the flow of said charge of water, closing the bottom of said first chamber following the flow of said charge of water, opening the top of said first chamber following the flow of said charge of said water, actuating said fresh ground coffee supply means associated with said first chamber and closing said first chamber top to prepare the machine for its next operation.

References Cited in the file of this patent

UNITED STATES PATENTS

| | | |
|---|---|---|
| 716,322 | Duke | Jan. 10, 1899 |
| 1,805,159 | Bauer et al. | May 12, 1931 |
| 1,813,872 | Bausman | July 7, 1931 |
| 2,367,401 | Jones | Jan. 16, 1945 |
| 2,521,347 | Davis | Sept. 5, 1950 |
| 2,660,340 | Thompson | Nov. 24, 1953 |
| 2,671,575 | Hilton | Mar. 9, 1954 |
| 2,809,661 | Gillespie et al. | Oct. 15, 1957 |
| 2,840,108 | Clymer | June 24, 1958 |
| 2,895,402 | Totton | July 21, 1959 |
| 2,972,292 | Waas et al. | Feb. 21, 1961 |

FOREIGN PATENTS

| | | |
|---|---|---|
| 28,418 | Great Britain | Dec. 24, 1907 |
| 714,971 | France | Sept. 14, 1931 |
| 451,476 | Great Britain | Aug. 6, 1936 |